United States Patent
Lee et al.

(10) Patent No.: US 11,625,859 B2
(45) Date of Patent: Apr. 11, 2023

(54) METHOD AND SYSTEM FOR CALIBRATING A CAMERA AND LOCALIZING OBJECTS WITHIN THE CAMERA FIELD OF VIEW

(71) Applicant: MOTOROLA SOLUTIONS, INC., Chicago, IL (US)

(72) Inventors: Chia Ying Lee, Medford, MA (US); Yin Wang, Woburn, MA (US); Aleksey Lipchin, Newton, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 342 days.

(21) Appl. No.: 16/935,464

(22) Filed: Jul. 22, 2020

(65) Prior Publication Data

US 2022/0028114 A1 Jan. 27, 2022

(51) Int. Cl.
| | |
|---|---|
| *G06T 7/80* | (2017.01) |
| *G01B 11/25* | (2006.01) |
| *G01B 11/02* | (2006.01) |
| *G06T 7/521* | (2017.01) |

(52) U.S. Cl.
CPC ............ *G06T 7/80* (2017.01); *G01B 11/026* (2013.01); *G01B 11/2504* (2013.01); *G01B 11/2518* (2013.01); *G06T 7/521* (2017.01)

(58) Field of Classification Search
USPC .................................. 382/154, 103; 348/143
See application file for complete search history.

(56) References Cited

U.S. PATENT DOCUMENTS

| | | | |
|---|---|---|---|
| 5,974,169 A | 10/1999 | Bachelder | |
| 6,185,314 B1 | 2/2001 | Crabtree et al. | |
| 9,322,647 B2 | 4/2016 | Datta et al. | |
| 2006/0215031 A1* | 9/2006 | Krahnstoever | G06T 7/80 348/187 |
| 2007/0127774 A1* | 6/2007 | Zhang | G08B 13/19602 382/103 |
| 2013/0169822 A1* | 7/2013 | Zhu | G06T 7/80 348/180 |

(Continued)

FOREIGN PATENT DOCUMENTS

| | | |
|---|---|---|
| EP | 3637313 A1 | 4/2020 |
| KR | 101976495 B1 | 5/2019 |

OTHER PUBLICATIONS

Criminisi, Antonio et al.: "A New Approach to Obtain Height Measurements from Video", Proceedings of SPIE—The International Society for Optical Engineering 3576, Jan. 2002, DOI: 10.1117/12.334540, all pages.

(Continued)

*Primary Examiner* — Kathleen Y Dulaney (57) ABSTRACT

A computer-implemented method of localizing an image of a person captured using a camera is provided, the person in the field of view of a camera, comprising: obtaining the image captured using a camera, the image comprising the person within a bounding box; determining at least one slant value associated with the person within the bounding box; determining head image coordinates and feet image coordinates for the person using the at least one slant value; and localizing the person by projecting the head image coordinates to a head plane and the feet image coordinates for the person to a ground plane.

12 Claims, 6 Drawing Sheets

(56) References Cited

U.S. PATENT DOCUMENTS

| | | | |
|---|---|---|---|
| 2014/0348382 A1* | 11/2014 | Sasatani | G06V 20/53 |
| | | | 382/103 |
| 2018/0060669 A1* | 3/2018 | Pham | G06T 7/73 |
| 2018/0165813 A1* | 6/2018 | Mai | G06T 7/11 |
| 2018/0173963 A1* | 6/2018 | Taylor | G06T 3/00 |
| 2020/0272839 A1* | 8/2020 | Seo | G06V 20/584 |
| 2020/0285845 A1* | 9/2020 | Oami | G06V 10/462 |
| 2021/0019914 A1* | 1/2021 | Lipchin | G06V 40/103 |

OTHER PUBLICATIONS

Johan Vester: Estimating the Height of an Unknown Object in a 2D Image, KTH Computer Science and Communication, Royal Institute of Technology, Master of Science Thesis, Stockholm, Sweden 2012, URL: www.kth.se/csc, TRITA-CSC-E 2012:040, ISRN-KTH/CSC/E-12/040-SE, ISSN-1653-5715, all pages.

* cited by examiner

METHOD AND SYSTEM FOR CALIBRATING A CAMERA AND LOCALIZING OBJECTS WITHIN THE CAMERA FIELD OF VIEW

BACKGROUND

Automated security and surveillance systems typically employ video cameras or other image capturing devices or sensors to collect image data such as video or video footage. Images represented by the image data may be displayed for contemporaneous screening by security personnel and/or recorded for later review.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

There is a need to calculate distances between objects found in the field of view of a camera, for example to maintain a social distance between persons. There are typically two requirements for being able to determine the position, or localization, of a person, namely camera parameters, such as focal length, camera height, pitch and roll; and precise feet and head image points for the person in the field of view. Typically, not all of these requirements are met, so there is a need for an improved technical method and system to accurately determine unknown camera parameters and localize the persons in the field of view of a camera.

In accordance with one example embodiment, a computer-implemented method of localizing an image of a person captured using a camera, the person in the field of view of a camera, comprising: obtaining the image captured using a camera, the image comprising the person within a bounding box; determining at least one slant value associated with the person within the bounding box; determining head image coordinates and feet image coordinates for the person using the at least one slant value; and localizing the person by projecting the head image coordinates to a head plane and the feet image coordinates for the person to a ground plane.

In accordance with another example embodiment, the method may further comprises determining the distance between the person and an object.

In accordance with another example embodiment, the at least one slant value is selected from $\delta_x$ or $\delta_y$, the center coordinates of the bounding box are represented as $(x_c, y_c)$, the head image coordinates are represented as $(x_c+\delta_x, y_c+\delta_y)$ and the feet image coordinates are represented as $(x_c-\delta_x, y_c-\delta_y)$.

In accordance with another example embodiment, the head coordinates and the feet coordinates model the person using a feet-to-head homology equation:

$$H \begin{bmatrix} x_{feet} \\ y_{feet} \\ 1 \end{bmatrix} = w \begin{bmatrix} x_{head} \\ y_{head} \\ 1 \end{bmatrix}$$

wherein:

$$H = \left( I - \frac{H_{human}}{H_{cam}} \frac{p_2(p_0 \times p_1)^T}{p_2^T(p_0 \times p_1)} \right)$$

which depends on camera parameters associated with the camera and wherein $H_{human}$ is a height of the person.

In accordance with another example embodiment the camera parameters comprise a height of the camera ($H_{cam}$), a camera focal length (f), a roll ($\theta$), and a pitch ($\rho$), and $p_0$, $p_1$, $p_2$ are the first three columns of a homography projection matrix P:

$$P = \begin{bmatrix} f\cos\rho & -f\sin\rho\cos\theta & f\sin\rho\sin\theta & -fH_{cam}\sin\rho\sin\theta \\ f\sin\rho & f\cos\rho\cos\theta & -f\cos\rho\sin\theta & fH_{cam}\cos\rho\sin\theta \\ 0 & \sin\theta & \cos\theta & -H_{cam}\cos\theta \end{bmatrix}$$

In accordance with another example embodiment a slant model homology formula is used to model the person, the slant model homology formula comprising:

$$H \begin{bmatrix} x_c - \delta_x \\ y_c - \delta_y \\ 1 \end{bmatrix} = w \begin{bmatrix} x_c + \delta_x \\ y_c + \delta_y \\ 1 \end{bmatrix}$$

In accordance with another example embodiment, the projecting the head image coordinates and the feet image coordinates comprises using homography projection equations:

$$\begin{bmatrix} x_c - \delta_x \\ y_c - \delta_y \\ 1 \end{bmatrix} w = P \begin{bmatrix} X \\ Y \\ 0 \\ 1 \end{bmatrix}$$

and $$\begin{bmatrix} x_c + \delta_x \\ y_c + \delta_y \\ 1 \end{bmatrix} w = P \begin{bmatrix} X \\ Y \\ H_{human} \\ 1 \end{bmatrix}$$

wherein (X, Y, Z=0) are the world coordinates of the feet coordinates and (X, Y, Z=$H_{human}$) are the world coordinates of the head coordinates.

In accordance with another example embodiment, the $\delta_x$ and $\delta_y$ values are predetermined for a plurality of pixels in the field of view, and wherein the $\delta_x$ and $\delta_y$ values are determined by selected the $\delta_x$ and $\delta_y$ values associated with a pixel in the plurality of pixels that is closest (xc, yc).

In accordance with another example embodiment, A computer implemented method of calibrating a camera having a field of view is provided, comprising: observing N persons within the field of view, for each person k, within the N persons, generating a bounding box; for each kth bounding box, determining ($\delta_{x,k}$, $\delta_{y,k}$), wherein the center coordinates of the bounding box are represented as ($x_{c,k}$, $y_{c,k}$), the head image coordinates for each kth person are represented as ($x_{c,k}+\delta_{x,k}$, $y_{c,k}+\delta_{y,k}$) and the feet image coordinates are represented as ($x_{c,k}-\delta_{x,k}$, $y_{c,k}-\delta_{y,k}$); and determining the camera parameters comprising a height of the camera (Hcam), a camera focal length (f), a roll (θ), and a pitch (ρ) that minimize a residual of:

$$H \begin{bmatrix} x_c - \delta_x \\ y_c - \delta_y \\ 1 \end{bmatrix} = w \begin{bmatrix} x_c + \delta_x \\ y_c + \delta_y \\ 1 \end{bmatrix}$$

In accordance with another example embodiment, the residual is minimized by calculating:

$$\min_{\{H_{cam}, f, \theta, \rho, w_k, k=1,\ldots,N\}} \sum_{k=1}^{N} |H p_{f,k} - w_k p_{h,k}|^2$$

where $p_{f,k}=(x_{c,k}-\delta_{x,k}, y_{c,k}-\delta_{y,k}, 1)^T$, $p_{h,k}=(x_{c,k}+\delta_{x,k}, y_{c,k}+\delta_{y,k}, 1)^T$ are the feet and head image coordinates respectively for the kth person, expressed as homogenous coordinates.

In accordance with another example embodiment, a security system is provided, comprising: a camera having a field of view including a person; and a processor communicatively coupled to the camera; and a memory device having stored thereon computer program code that is executable by the processor, and when executed by the processor, causes the processor to: obtain an image of the person captured using a camera, the image comprising the person within a bounding box; determine at least one slant value associated with the person within the bounding box; determine head image coordinates and feet image coordinates for the person using the at least one slant value; and localize the person by projecting the head image coordinates to a head plane and the feet image coordinates for the person to a ground plane.

In accordance with another example embodiment, the processor is further caused to determine the distance between the person and an object.

In accordance with another example embodiment, the processor is further caused to use a slant model homology formula to model the person, the slant model homology formula comprising:

$$H \begin{bmatrix} x_c - \delta_x \\ y_c - \delta_y \\ 1 \end{bmatrix} = w \begin{bmatrix} x_c + \delta_x \\ y_c + \delta_y \\ 1 \end{bmatrix}$$

In accordance with another example embodiment, the processor is further caused to project the head image coordinates and the feet image coordinates using homography projection equations:

$$\begin{bmatrix} x_c - \delta_x \\ y_c - \delta_y \\ 1 \end{bmatrix} w = P \begin{bmatrix} X \\ Y \\ 0 \\ 1 \end{bmatrix}$$

and $$\begin{bmatrix} x_c + \delta_x \\ y_c + \delta_y \\ 1 \end{bmatrix} w = P \begin{bmatrix} X \\ Y \\ H_{human} \\ 1 \end{bmatrix}$$

wherein (X, Y, Z=0) are the world coordinates of the feet coordinates and (X, Y, Z=$H_{human}$) are the world coordinates of the head coordinates.

Each of the above-mentioned embodiments will be discussed in more detail below, starting with example system and device architectures of the system in which the embodiments may be practiced, followed by an illustration of processing blocks for achieving an improved technical method, device, and system for calibrating a camera and localizing objects within the camera field of view.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

Processing video may include, but is not limited to, image processing operations, analyzing, managing, compressing, encoding, storing, transmitting and/or playing back the video data. Analyzing the video may include segmenting areas of image frames and detecting visual objects, and/or tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames. "Metadata" or variants thereof herein refers to information obtained by computer-implemented analysis of images including images in video.

Figure 1:
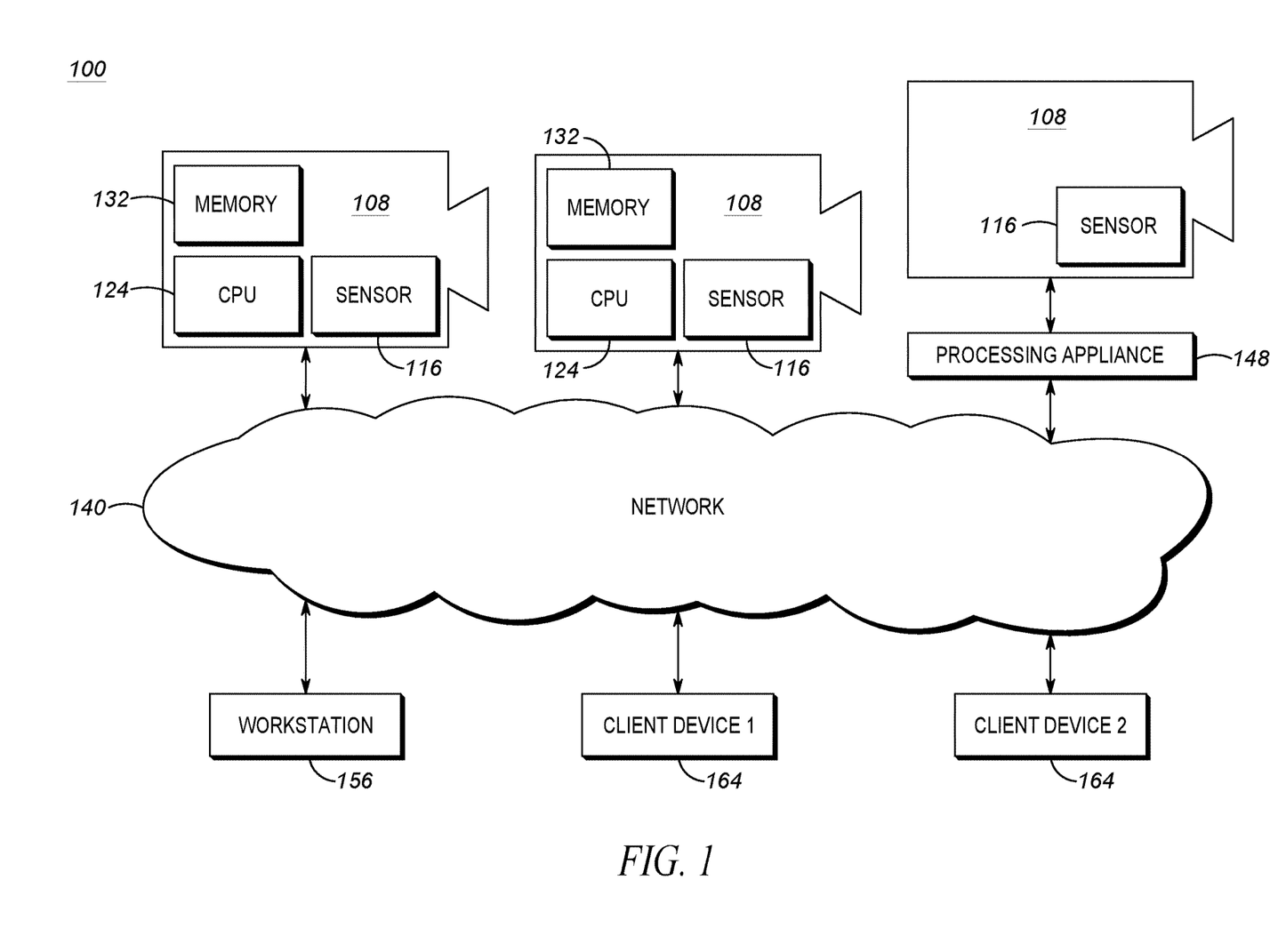
FIG. 1 is a block diagram of connected devices of a video capture and playback system according to an example embodiment.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a security camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 132 and the network interface may be implemented within a SOC. Furthermore, when implemented in this way, a general purpose processor and one or more of a GPU or VPU, and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one example embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptop, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 186 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
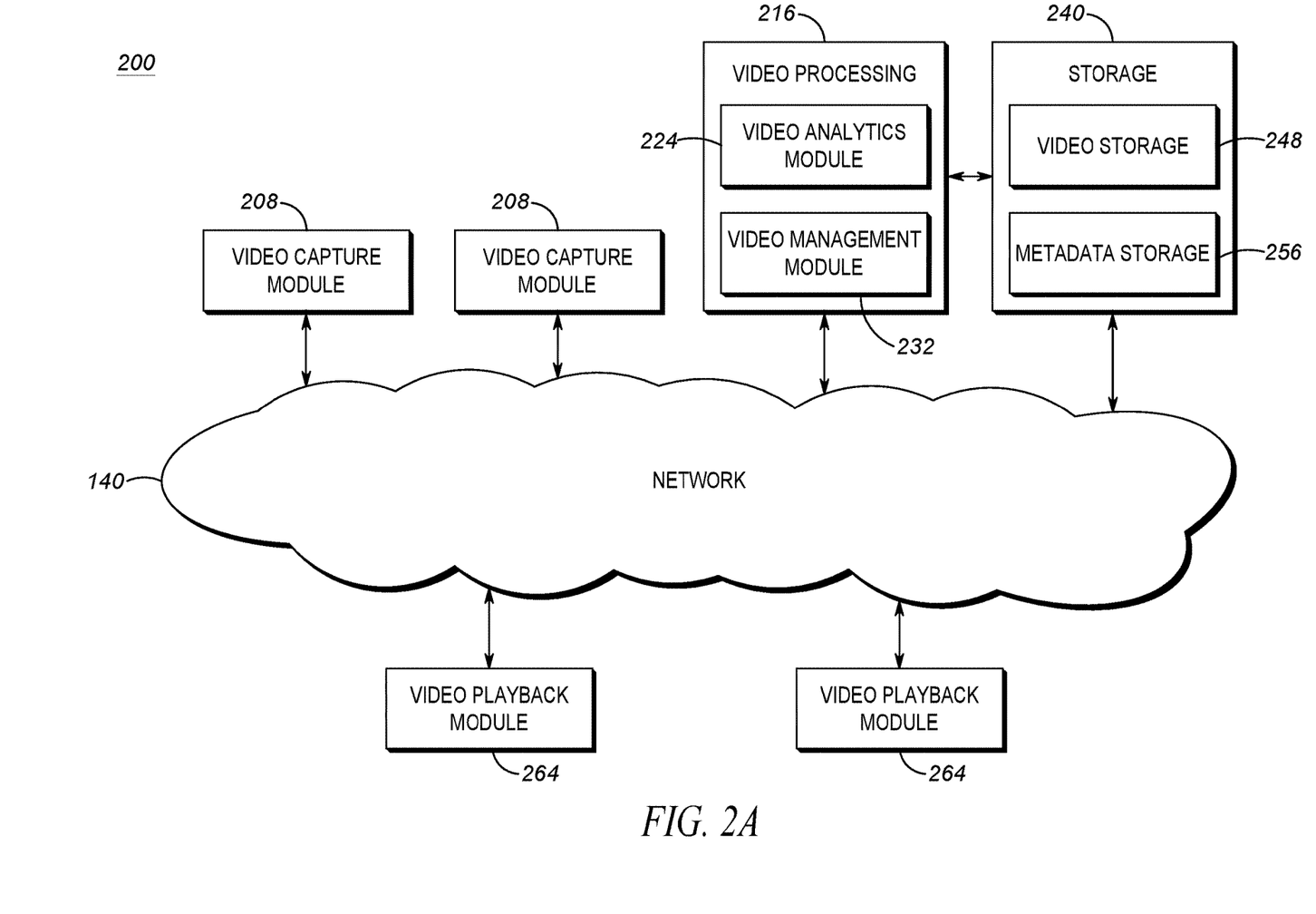
FIG. 2A is a block diagram of a set of operational modules of the video capture and playback system according to an example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156, and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
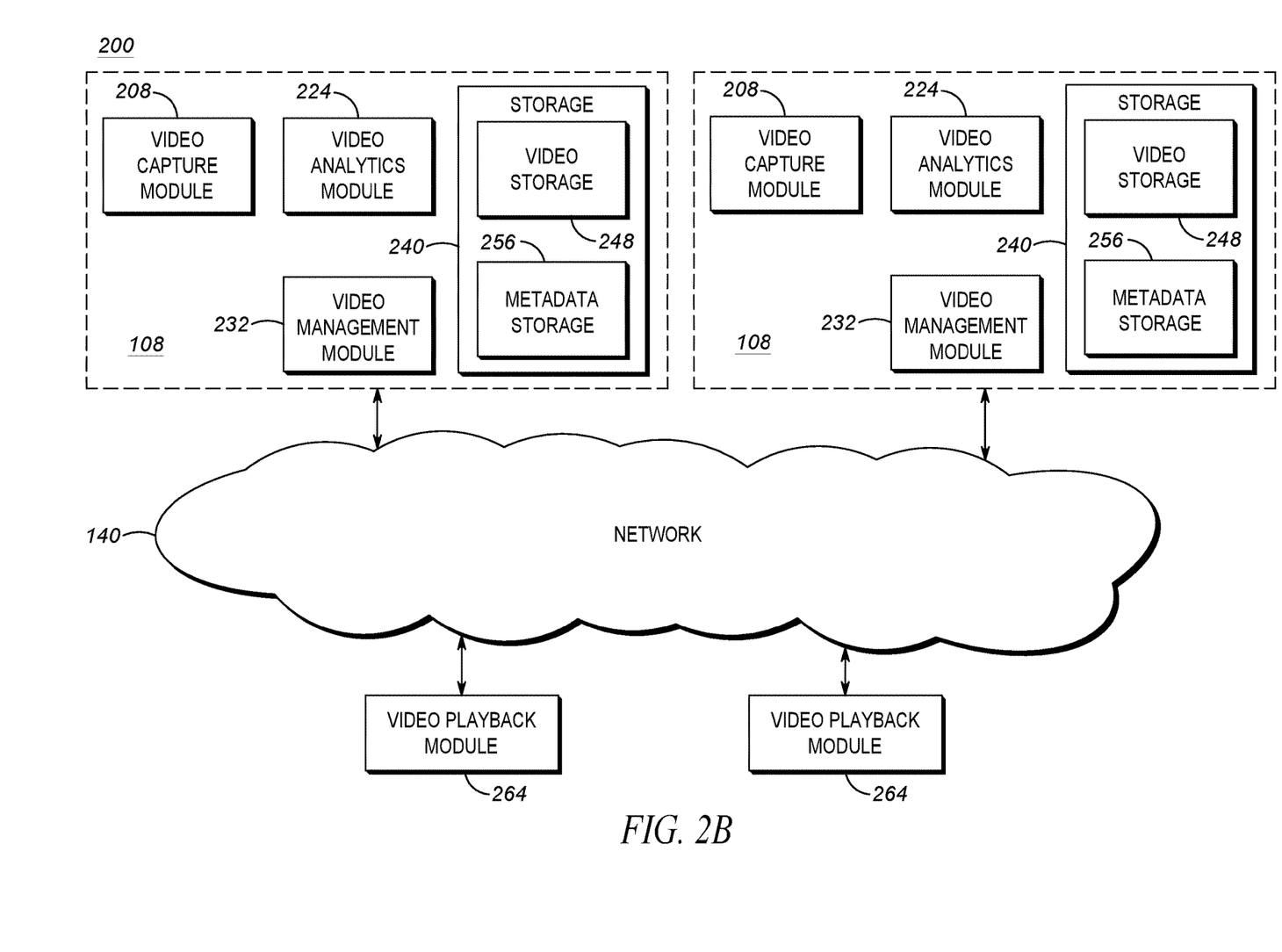
FIG. 2B is a block diagram of a set of operational modules of the video capture and playback system according to a particular example embodiment wherein the video analytics module 224, the video management module 232 and the storage 240 is wholly implemented on the one or more image capture devices 108.

Referring now to FIG. 2B, therein illustrated is a block diagram of a set 200 of operational modules of the video capture and playback system 100 according to one particular example embodiment wherein the video analytics module 224, the video management module 232 and the storage 240 is wholly implemented on the one or more image capture devices 108. Alternatively, the video analytics module 224, the video management module 232 and the storage 240 is wholly or partially implemented on one or more processing appliances 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

In at least some example embodiments, it may be desirable to be able to determine information about objects in the field of view captured by camera 108, for example, the distance between two or more objects, which requires transposing the images onto a two- or three-dimensional plane. For example, there may be a desire to keep individuals a set distance, for example, 6 feet, away from each other for a certain purpose, for example to reduce the likelihood of disease spread, such as COVID-19.

Other information about objects that may be useful include: measuring the speed of an object such as a person or vehicle, which requires knowing the location of the object over time, i.e. multiple frames; identifying when an object exceeds a height limit, for example a vehicle entering a garage, which requires determination of the height of the vehicle; determining the landscape of uneven ground, which requires determining the location of the object's bottom (feet, in the case of a person); and detecting abnormal groups of persons or vehicles, by, for example, determining the distance between group members, and thereby the density of the group.

There is certain information needed to determine the distance of an object from another object within the field of view of camera 108. For example, certain camera parameters, both intrinsic (focal length) and extrinsic (camera height, pitch, and roll). In practice not all of these parameters may be known, for example in many situations the camera height may not be known.

To determine the distance between persons, image points representing the head and feet of the persons are used. Objects, such as people and vehicles, are bounded by camera 108 in rectangular boxes, known as "bounding boxes". Bounding boxes have fixed horizontal and vertical lines parallel to the edges of the image captured and are sized to capture the entire object, thus determining the head and feet image points cannot be done directly from the bounding box, particularly as in most cases the image of the person will not align with the edges of the bounding box.

Figure 3:
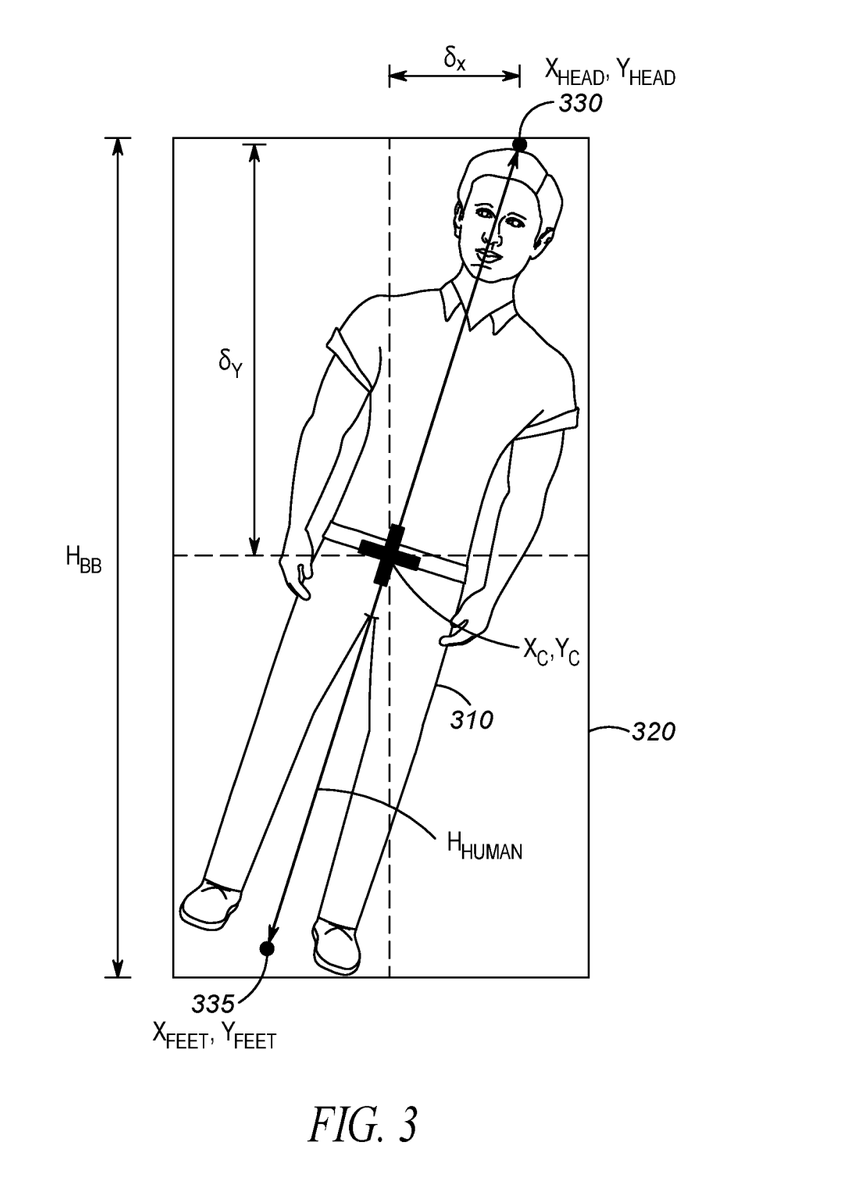
FIG. 3 is a drawing of a bounding box and an object within according to an example embodiment.

Referring now to FIG. 3, an object, in this case person 310, is positioned within bounding box 320. The person 310 in the bounding box 320 appears at an angle within bounding box 320, rather than aligned with vertical edges of bounding box 320, so the height of the bounding box ($H_{bb}$) is not equal to the height of person 310 ($H_{human}$). The measurements referred to herein in relation to an image may be in pixels, or alternatively can be in measurements such as millimeters, and converted to meters or feet on localization of the image. As shown in FIG. 3, $\delta_x$ represents the distance of $X_{head}$ from $X_c$, and $\delta_y$ represents the distance from $Y_{head}$ to $Y_c$. $\delta_x$ and $\delta_y$ therefore represent the "slant" of the feet image coordinates to the head image coordinates relative to the bounding box 320.

A line segment human model can be used to model the location of person 310 within the bounding box, and is referred to as a "slant model". The locations of the head image coordinates 330 and feet image coordinates 335 can be mapped using a feet-to-head homology equation:

$$H \begin{bmatrix} x_{feet} \\ y_{feet} \\ 1 \end{bmatrix} = w \begin{bmatrix} x_{head} \\ y_{head} \\ 1 \end{bmatrix} \quad (1)$$

where:

$$H = \left( I - \frac{H_{human}}{H_{cam}} \frac{p_2 (p_0 \times p_1)^T}{p_2^T (p_0 \times p_1)} \right) \quad (2)$$

which is a homology matrix that depends on the camera parameters, namely height of the camera ($H_{cam}$), and camera focal length (f), roll (θ), and pitch (ρ) as well as human height $H_{human}$, in which w is a scalar, and in which $p_0$, $p_1$, $p_2$ are the first three columns of the homography projection matrix P:

$$P = \begin{bmatrix} f\cos\rho & -f\sin\rho\cos\theta & f\sin\rho\sin\theta & -fH_{cam}\sin\rho\sin\theta \\ f\sin\rho & f\cos\rho\cos\theta & -f\cos\rho\sin\theta & fH_{cam}\cos\rho\sin\theta \\ 0 & \sin\theta & \cos\theta & -H_{cam}\cos\theta \end{bmatrix} \quad (3)$$

The feet to head homology formula maps the feet image coordinates 335 ($X_{feet}$, $Y_{feet}$) to the head image coordinates 330 ($X_{head}$, $Y_{head}$) of person 310, as $H_{human}$, within bounding box 320. The slant model models the locations of the feet and head as:

($x_c$, $y_c$): centroid image coordinates
($x_c-\delta_x$, $y_c-\delta_y$): feet image coordinates
($x_c+\delta_x$, $y_c+\delta_y$): head image coordinates Incorporating the slant model into the feet-to-head homology formula (Equation (1)) yields:

$$H \begin{bmatrix} x_c - \delta_x \\ y_c - \delta_y \\ 1 \end{bmatrix} = w \begin{bmatrix} x_c + \delta_x \\ y_c + \delta_y \\ 1 \end{bmatrix} \quad (4)$$

In cases in which the detected bounding boxes 320 are free of noise and the object's height is known, Equation (4), also referred to as the slant model homology equation, will hold exactly. In practice, bounding boxes may be noisy, or the human height may not be known exactly. In these cases, the homology formula holds approximately within a reasonable margin of error.

Camera Parameter Estimation

There are a variety of conventional camera calibration methods; generally these methods can be divided between those that require user interaction and automatic methods, which do not. The methods that require user interaction often involve manually placing objects with calibration patterns in the camera's 108 field of view, measuring distances between points in the camera's field of view, or manually marking up an image with lines; practically, those methods are inefficient.

Figure 4:
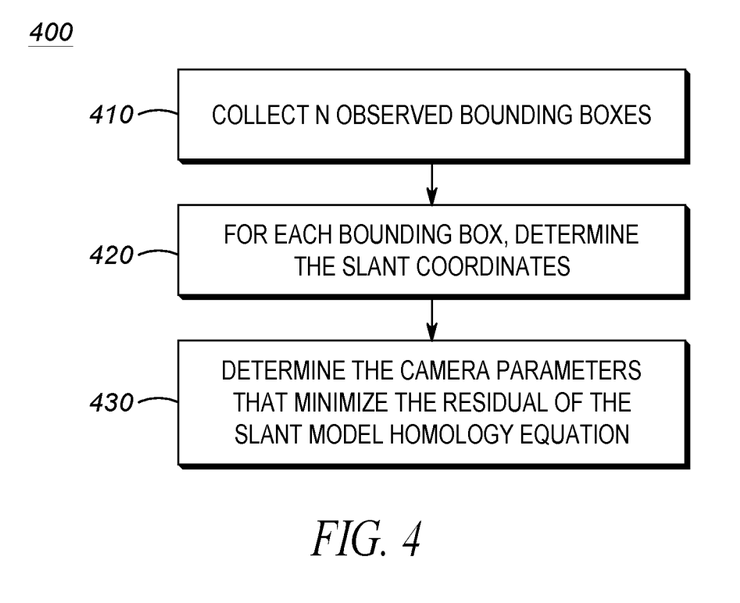
FIG. 4 is a flow chart showing a method for calibrating a camera using bounding boxes, according to an example embodiment.

Referring now to FIG. 4, the camera parameters ($H_{cam}$, f, θ, ρ) may be estimated using the slant model incorporated into the feet-to-head homology formula in several ways, including solving the slant model homology equation (Equation (4)), or confirming accuracy of predictions obtained using the slant model homology equation (Equation (4)).

In an example embodiment generally referred to at 400, at block 410, N observed detection bounding boxes from camera 108b are collected. For each k-th bounding box of the set of N bounding boxes, the slant coordinates $\delta_x$ and $\delta_y$ are determined (block 420).

The camera parameters that minimize the residual of Eq. (4) are then determined (block 430), i.e.:

$$\min_{\{H_{cam},f,\theta,\rho,w_k,k=1,\ldots,N\}} \sum_{k=1}^{N} |Hp_{f,k} - w_k p_{h,k}|^2 \quad (5)$$

where $p_{f,k}=(x_{c,k}-\delta_{x,k}, y_{c,k}-\delta_{y,k}, 1)^T$, $p_{h,k}=(x_{c,k}+\delta_{x,k}, y_{c,k}+\delta_{y,k}, 1)^T$ are the feet and head image coordinates respectively, expressed as homogenous coordinates, obtained as described above for the k-th detection, and ($\delta_{x,k}$, $\delta_{y,k}$) are the "slant" coordinates for the k-th detection computed from Eq. (4) given the parameters $H_{cam}$, f, θ, ρ. The slant coordinates in Equation (5) depend on the camera parameters which are being minimized over, i.e. a minimization algorithm iteratively improves its "guess" for the best camera parameters (i.e. the camera parameters that minimize the residual), and at each iteration the current guess is used to compute the slant coordinates for each bounding box.

According to another example embodiment, the camera parameters that minimize the reprojection error are determined using the formula:

$$\min_{\{H_{cam},f,\theta,\rho\}} \sum_{k=1}^{N} |y_{h,k}^{(obs)} - y_{h,k}^{(pred)}|^2 \quad (6)$$

where $y_{h,k}^{(pred)}=y_c+\delta_y$, and where ($\delta_{x,k}$, $\delta_{y,k}$) are the "slant" coordinates for the k-th detection computed from Eq. (4) given the parameters $H_{cam}$, f, θ, ρ. The difference between the predicted and observed values is the reprojection error.

Equations (5) and (6) may be used if all or some of the camera parameters are unknown. They may also be used in combination with outlier rejection methods, e.g. RANSAC or MSAC, or with robust least squares methods using Huber loss, or soft L^1 loss.

In some situations, the only unknown camera parameter is camera height, $H_{cam}$. In such circumstances a modified process can be used. The detected bounding boxes can be filtered, so that only bounding boxes with a suitable aspect ratio are used. This can be used, for example, to exclude bounding boxes that by aspect ratio, are unlikely to represent a full height of the person. For each of the N bounding boxes remaining after filtering, the camera height ($H_{cam}$), x-slant ($\delta_k$), and homogeneous coordinate (w) are estimated simultaneously, either by solving Equation (4) exactly, or by minimizing the residual of Equation (4) to solve for ($H_{cam}$), $\delta_x$, and w:

$$\min_{\{H_{cam},\delta_x,w\}} \sum_{k=1}^{N} \left| H \begin{bmatrix} x_c - \delta_x \\ y_c - \delta_y \\ 1 \end{bmatrix} - w \begin{bmatrix} x_c + \delta_x \\ y_c + \delta_y \\ 1 \end{bmatrix} \right|^2 \quad (7)$$

In this case, the δy is set at half the bounding box height ($H_{bb}$) and the human height ($H_{human}$) set to an average value (e.g. 1.7 m). The estimation method used may be a least squares minimization of the residual; or it may be an approximation method that assumes roll (θ) is small, such as a standard technique of multiscale expansion in θ, or, alternatively to set θ to be zero.

The estimated camera height Hcam can then be determined as an average of Hcam values as determined for each of the N bounding boxes. In an example embodiment further outlier rejection methods, such as determining the interquartile mean or geometric median may be used. Alternatively, robust regression methods such as sparse L^1 minimization may be used.

Object Localization

Figure 5:
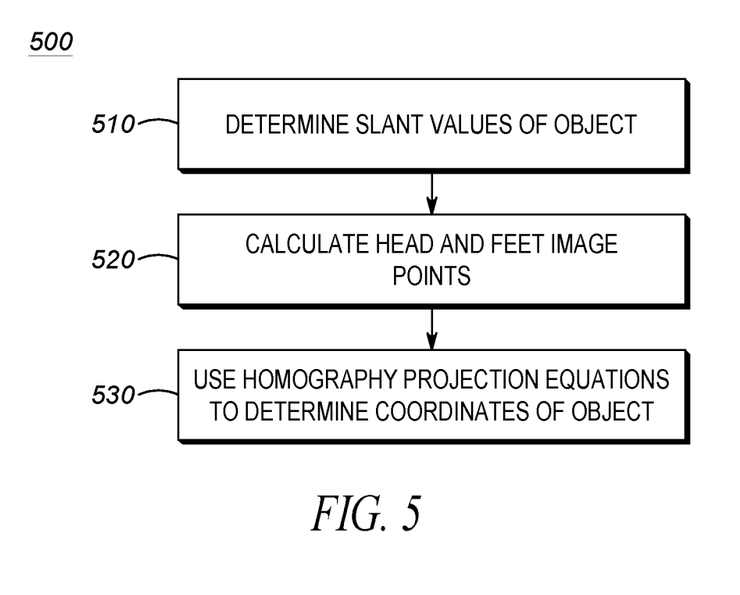
FIG. 5 is a flow chart showing a method of localizing an object in a bounding box, according to an example embodiment.

Referring now to FIG. 5, method 500 is provided to localize a detected object in the real world. At block 510, the slant values ($\delta_{x,k}$, $\delta_{y,k}$) are obtained from Eq. (4) given the parameters $H_{cam}$, f, θ, ρ (which are now known or estimated as described above). The slant values ($\delta_{x,k}$, $\delta_{y,k}$) can either be computed for each bounding box 320 as it is detected; or the slant values ($\delta_{x,k}$, $\delta_{y,k}$) can be precomputed for a plurality of pixels in a grid of pixel locations within the field of view, and the slant values ($\delta_{x,k}$, $\delta_{y,k}$) associated with the pixel that is closest to the detection centroid (xc, yc) of the bounding box 320 is retrieved and used at runtime.

The feet and head image points are then be calculated at block 520, using the slant values ($\delta_{x,k}$, $\delta_{y,k}$) as described above. The object, such as person 310, can then be localized using homography projection equations (block 530):

$$\begin{bmatrix} x_c - \delta_x \\ y_c - \delta_y \\ 1 \end{bmatrix} w = P \begin{bmatrix} X \\ Y \\ 0 \\ 1 \end{bmatrix} \quad (8)$$

and $$\begin{bmatrix} x_c + \delta_x \\ y_c + \delta_y \\ 1 \end{bmatrix} w = P \begin{bmatrix} X \\ Y \\ H_{human} \\ 1 \end{bmatrix} \quad (9)$$

wherein (X, Y, Z=0) are the world coordinates of the feet (the ground plane) and (X, Y, Z=$H_{human}$) are the world coordinates of the head.

Figure 6:
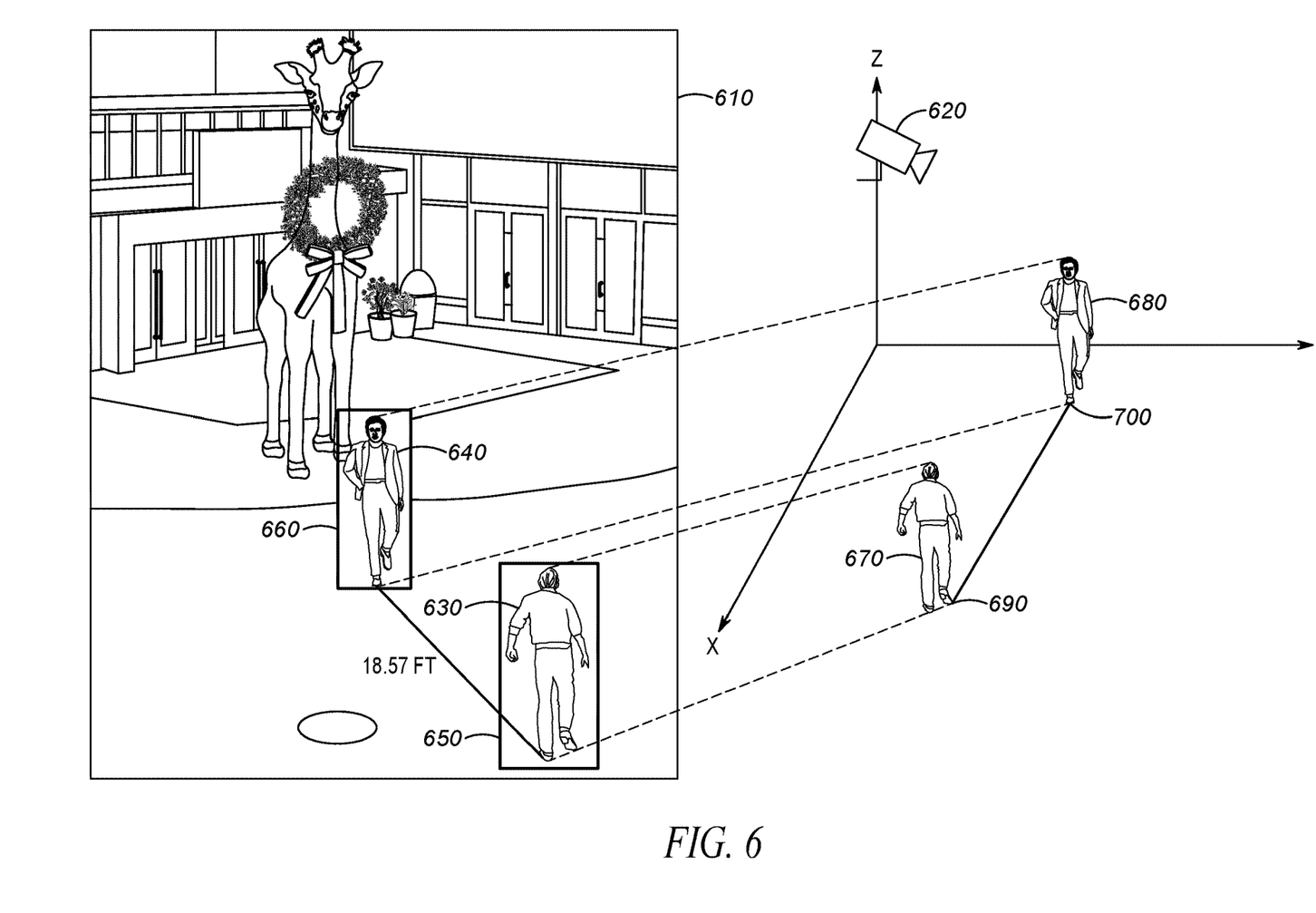
FIG. 6 shows a diagram of a field of view of a camera that has detected two persons and the localization of the persons to a three-dimensional location according to an example embodiment.

With reference to FIG. 6, a field of view 610 of camera 620 is shown in which two objects, first person 630 and second person 640 have been detected and are identified in respective bounding boxes 650, 660. Once, as described above, first person 630 is localized on a X, Y, Z plane as first object 670 and second person 640 is localized as second object 680, the localized feet coordinates ($X_{1feet}$, $Y_{1feet}$) 690 of first person 310 are known as are the localized feet coordinates ($X_{2feet}$, $Y_{2feet}$) 700 of second person, so the distance between first person 630 and second person 640, can be determined using the square root of $(X_{1feet} - X_{2feet})^2 + (Y_{1feet} - Y_{2feet})^2$.

On occasion, the feet of the object within the bounding box may be occluded, and in such circumstances, the head coordinates ($X_{head}$, $Y_{head}$) of the objects as projected to world coordinates can be used for determining the distance between objects.

Use Cases

According to an example embodiment, the system and method described herein can be used to determine the distance between two or more objects in the field of view of a camera 108. This can be used, for example, to enforce a social distancing requirement intended to avoid transmission of a disease, such as coronavirus, to prevent the spread of COVID-19. In such an embodiment, a rule could be prepared using video management module 232 so that when two persons are less than a certain minimum distance apart (e.g. six feet or two meters), an alert is generated.

According to an example embodiment the system and method described herein can be used to identify persons that exceed or do not meet a certain height. In such an embodiment, once the height of the person is determined, for example, a gate may not open to prevent the person from taking a ride, for example at an amusement park, for which that person does not meet the height requirement.

According to an example embodiment the system and method described herein can be used to measure speed of objects, such as a vehicle or person. Once the real world localized coordinates (X, Y, Z) of an object are known, that object can be tracked by video analytics module 224 and a distance/time calculation can be made to determine the speed of the object. In such an embodiment a rule could be prepared using video management module 232 so that when a selected speed is surpassed, an alert is generated.

According to another example embodiment, the method and system described herein could be used to determine unusual attributes of crowds, particularly related to crowd density. Once a plurality of objects in a field of view are localized as described herein and the distance between the objects, or each objects nearest neighbor calculated, the density of the objects within a space can be determined, and video management module 232 can be used to set an alert if the density is above or below a certain predetermined threshold.

Simulation Results

In a test video, the camera height ($H_{cam}$), pitch ($\rho$) and roll ($\theta$), were estimated from detections in approximately 5000 frames. The three estimated parameters were obtained by minimizing the reprojection error with slant model. Additionally, RANSAC was used to reject outlier detections. It was assumed that focal length is known and fixed (f=1307 pixels). The results, as compared to the ground truth were:

TABLE 1

| | Ground Truth | Estimated |
|---|---|---|
| Camera Height | 2.42 m | 2.33 m |
| Pitch | 25.3° | 24.6° |
| Roll | 0° | −2.7° |

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot minimize residuals of the slant model homology equations, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computer-implemented method of localizing an image of a person captured using a camera, the person in a field of view of a camera, comprising:
   obtaining the image captured using a camera, the image comprising the person within a bounding box;
   determining at least one slant value associated with the person within the bounding box;
   determining head image coordinates and feet image coordinates for the person using the at least one slant value;
   localizing the person by projecting the head image coordinates to a head plane and the feet image coordinates for the person to a ground plane; and
   wherein the at least one slant value is selected from $\delta_x$ or $\delta_y$, center coordinates of the bounding box are represented as $(x_c, y_c)$, the head image coordinates are represented as $(x_c+\delta_x, y_c+\delta_y)$ and the feet image coordinates are represented as $(x_c+\delta_x, y_c+\delta_y)$.

2. The method of claim 1, further comprising determining a distance between the person and an object in the field of view of the camera.

3. The method of claim 1 wherein the head coordinates and the feet coordinates model the person using a feet-to-head homology equation:

$$H \begin{bmatrix} x_{feet} \\ y_{feet} \\ 1 \end{bmatrix} = w \begin{bmatrix} x_{head} \\ y_{head} \\ 1 \end{bmatrix}$$

wherein:

$$H = \left( I - \frac{H_{human}}{H_{cam}} \frac{p_2(p_0 \times p_1)^T}{p_2^T(p_0 \times p_1)} \right)$$

which depends on camera parameters associated with the camera and wherein $H_{human}$ is a height of the person, wherein the camera parameters further comprise a height of the camera ($H_{cam}$), a camera focal length (f), a roll ($\theta$), and a pitch ($\rho$), w is a scalar, T is a transpose operation, and $p_0$, $p_1$, $p_2$ are the first three columns of a homography projection matrix P:

$$P = \begin{bmatrix} f\cos\rho & -f\sin\rho\cos\theta & f\sin\rho\sin\theta & -fH_{cam}\sin\rho\sin\theta \\ f\sin\rho & f\cos\rho\cos\theta & -f\cos\rho\sin\theta & fH_{cam}\cos\rho\sin\theta \\ 0 & \sin\theta & \cos\theta & -H_{cam}\cos\theta \end{bmatrix}.$$

4. The method of claim 3 wherein a slant model homology formula is used to model the person, the slant model homology formula comprising:

$$H \begin{bmatrix} x_c - \delta_x \\ y_c - \delta_y \\ 1 \end{bmatrix} = w \begin{bmatrix} x_c + \delta_x \\ y_c + \delta_y \\ 1 \end{bmatrix}.$$

5. The method of claim 4 wherein the projecting the head image coordinates and the feet image coordinates comprises using homography projection equations:

$$\begin{bmatrix} x_c - \delta_x \\ y_c - \delta_y \\ 1 \end{bmatrix} w = P \begin{bmatrix} X \\ Y \\ 0 \\ 1 \end{bmatrix}$$

and $$\begin{bmatrix} x_c + \delta_x \\ y_c + \delta_y \\ 1 \end{bmatrix} w = P \begin{bmatrix} X \\ Y \\ H_{human} \\ 1 \end{bmatrix}$$

wherein (X, Y, Z=0) are world coordinates of the feet coordinates and (X, Y, Z=$H_{human}$) are world coordinates of the head coordinates.

6. The method of claim 1 wherein the $\delta_x$ and $\delta_y$ values are predetermined for a plurality of pixels in the field of view, and wherein the $\delta_x$ and $\delta_y$ values are determined by selected the $\delta_x$ and $\delta_y$ values associated with a pixel in the plurality of pixels that is closest ($x_c$, $y_c$).

7. A security system comprising:
a camera having a field of view including a person; and
a processor communicatively coupled to the camera; and
a memory device having stored thereon computer program code that is executable by the processor, and when executed by the processor, causes the processor to:
obtain an image of the person captured using the camera, the image comprising the person within a bounding box;
determine at least one slant value associated with the person within the bounding box;
determine head image coordinates and feet image coordinates for the person using the at least one slant value;
localize the person by projecting the head image coordinates to a head plane and the feet image coordinates for the person to a ground plane; and
wherein the at least one slant value is selected from $\delta_x$ or $\delta_y$, the center coordinates of the bounding box are represented as ($x_c$, $y_c$), the head image coordinates are represented as ($x_c+\delta_x$, $y_c+\delta_y$) and the feet image coordinates are represented as ($x_c-\delta_x$, $y_c-\delta_y$).

8. The system of claim 7, wherein the processor is further caused to determine a distance between the person and an object.

9. The system of claim 7 wherein the head coordinates and the feet coordinates model the person using a feet-to-head homology equation:

$$H \begin{bmatrix} x_{feet} \\ y_{feet} \\ 1 \end{bmatrix} = w \begin{bmatrix} x_{head} \\ y_{head} \\ 1 \end{bmatrix}$$

wherein:

$$H = \left( I - \frac{H_{human}}{H_{cam}} \frac{p_2(p_0 \times p_1)^T}{p_2^T(p_0 \times p_1)} \right)$$

which depends on camera parameters associated with the camera and wherein $H_{human}$ is a height of the person, wherein the camera parameters comprise a height of the camera ($H_{cam}$), a camera focal length (f), a roll ($\theta$), and a pitch ($\rho$), T is a transpose operation, and $p_0$, $p_1$, $p_2$ are the first three columns of a homography projection matrix P:

$$P = \begin{bmatrix} f\cos\rho & -f\sin\rho\cos\theta & f\sin\rho\sin\theta & -fH_{cam}\sin\rho\sin\theta \\ f\sin\rho & f\cos\rho\cos\theta & -f\cos\rho\sin\theta & fH_{cam}\cos\rho\sin\theta \\ 0 & \sin\theta & \cos\theta & -H_{cam}\cos\theta \end{bmatrix}.$$

10. The system of claim 9 wherein the processor is further caused to use a slant model homology formula to model the person, the slant model homology formula comprising:

$$H \begin{bmatrix} x_c - \delta_x \\ y_c - \delta_y \\ 1 \end{bmatrix} = w \begin{bmatrix} x_c + \delta_x \\ y_c + \delta_y \\ 1 \end{bmatrix}.$$

11. The system of claim 10 wherein the processor is further caused to project the head image coordinates and the feet image coordinates using homography projection equations:

$$\begin{bmatrix} x_c - \delta_x \\ y_c - \delta_y \\ 1 \end{bmatrix} w = P \begin{bmatrix} X \\ Y \\ 0 \\ 1 \end{bmatrix}$$

and $$\begin{bmatrix} x_c + \delta_x \\ y_c + \delta_y \\ 1 \end{bmatrix} w = P \begin{bmatrix} X \\ Y \\ H_{human} \\ 1 \end{bmatrix}$$

wherein (X, Y, Z=0) are the world coordinates of the feet coordinates and (X, Y, Z=$H_{human}$) are the world coordinates of the head coordinates.

12. The system of claim 7 wherein the $\delta_x$ and $\delta_y$ values are predetermined for a plurality of pixels in the field of view of the camera, and wherein the $\delta_x$ and $\delta_y$ values are determined by selected the $\delta_x$ and $\delta_y$ values associated with a pixel in the plurality of pixels that is closest ($x_c$, $y_c$).

* * * * *